United States Patent Office 2,954,400
Patented Sept. 27, 1960

2,954,400
α-INDANOXYBUTYRIC ACID DERIVATIVES

Seymour L. Shapiro, Hastings on Hudson, and Louis Freedman, Bronxville, N.Y., assignors to U.S. Vitamin & Pharmaceutical Corporation, a corporation of Delaware No Drawing. Filed Apr. 9, 1958, Ser. No. 727,260

2 Claims. (Cl. 260—520)

This invention is concerned with the α-indanoxybutyric acids and their derivatives which have valuable pharmacological properties.

More particularly, the invention is concerned with compounds of the following formulas,

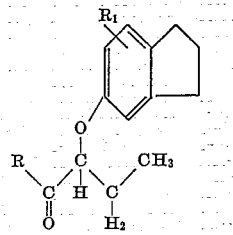

and

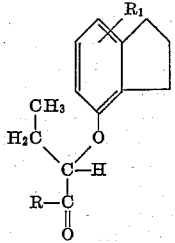

where R is selected from the group consisting of hydroxy (yielding the corresponding acids), alkoxy (yielding the corresponding esters), and arylalkylamino and dialkylaminoalkylamino (yielding the corresponding amides), and $R_1$ is hydrogen, benzyl or halobenzyl.

The compounds of this invention have certain structural resemblance to the pharmacologically active steroids and alkaloids, and show broad spectrum pharmacological activity. For example, anti-inflammatory, choleretic, tranquilizing and hypocholesteremic effects are obtained.

The compounds of this invention may be prepared by reaction of the indanol or the benzylated indanol with an α-halobutyric acid derivative, condensed in an organic solvent in the presence of an acid acceptor.

Suitably, the indanol or benzylated indanol is treated with ethyl α-bromobutyrate in acetone, under reflux, using potassium carbonate as the acid acceptor, and the reaction mixture is processed to yield the ethyl α-indoxybutyrate.

In turn, the ethyl α-indoxybutyrate can be saponified to afford the corresponding acid, or treated with amines to yield the corresponding amides.

The benzyl indanols and halobenzylated indanols which are initial reactants in some of the syntheses to be described are obtained by condensation of the indanol with a benzyl halide or halobenzyl halide. (See applicants' copending application, Serial No. 637,636, filed February 1, 1957, with co-inventor, Weinberg, for preparation of the reactant benzylated indanols.)

The following examples will serve to illustrate the invention without limiting it thereto.

EXAMPLE 1

A mixture of 26.8 g. (0.2 mole) of 4-indanol, 39 g. (0.2 mole) of ethyl α-bromobutyrate and 27.6 g. (0.2 mole) of anhydrous potassium carbonate in 80 ml. of acetone was stirred and heated under reflux for 4 hours. When cool, the solid was removed by filtration. The filtrate was diluted with 250 ml. of ice water and then extracted with three 100 ml. portions of ether. The ethereal extracts were combined, washed with N sodium hydroxide, washed with water and then dried (anhydrous magnesium sulfate). After filtration, the ether was removed and the residue distilled. There was obtained 24 g. of ethyl α-(indan-4-oxy)butyrate, B.P. 114–118° C. at 0.2 mm.

EXAMPLE 2

A mixture of 3.7 g. (0.015 mole) of ethyl α-(indan-4-oxy)butyrate and 15 ml. of diethylaminoethyl amine was heated under reflux for 8 hours. The reaction mixture was then fractionally distilled, and there was obtained 3.12 g. of the diethylaminoethyl amide of α-(indan-4-oxy) butyric acid, B.P. 156–158° C. at 0.12 mm.

*Analysis.*—Calcd. for $C_{19}H_{30}N_2O_2$: C, 71.7; H, 9.5; N, 8.8. Found: C, 70.9; H, 9.9; N, 9.0.

EXAMPLE 3

In a manner similar to that described in Example 1, a mixture of 29.1 g. (0.13 mole) of 6-benzyl-5-indanol, 25.4 g. (0.13 mole) of ethyl α-bromobutyrate and 17.9 g. (0.13 mole) of potassium carbonate in 80 ml. of acetone was processed to yield 21.9 g. of ethyl α-(6-benzylindan-5-oxy)butyrate which boiled at 182–190° C. at 0.7 mm.

In a manner similar to that described in Example 2, the ester above was converted to the diethylaminoethyl amide of α-(6-benzylindan-5-oxy)butyric acid, B.P. 202–212° C. at 0.1 mm.

*Analysis.*—Calcd. for $C_{26}H_{36}N_2O_2$: C, 76.4; H, 8.8; N, 6.9. Found: C, 76.5; H, 8.8; N, 6.7.

This amide when evaluated as an analgesic and anti-inflammatory agent, following the procedure of E. Siegmund, R. Cadmus and G. Lu (Proc. Soc. Exp. Biol. Med., 95, 729 (1957)), showed 88% protection at 50 mg./kg.

EXAMPLE 4

In a manner similar to that described in Example 1, a mixture of 17.2 g. (0.13 mole) of 5-indanol, 25.0 g. (0.13 mole) of ethyl α-bromobutyrate and 17.7 g. (0.13 mole) of potassium carbonate in 50 ml. of acetone was processed to yield 18.4 g. of ethyl α-(indan-5-oxy)butyrate which boiled at 122–126° C. at 0.3 mm.

*Analysis.*—Calcd. for $C_{15}H_{20}O_3$: C, 72.6; H, 8.1. Found: C, 73.1; H, 8.3.

A solution of 3.7 g. (0.015 mole) of the ester above in 15 ml. of β-phenethylamine was heated under reflux for 8 hours. On fractional distillation there was obtained 4.66 g. of the β-phenethylamide of α-(indan-5-oxy)butyric acid which boiled at 182° C. at 0.03 mm. This compound crystallized on standing, and when recrystallized from ethanol-water mixture melted at 64° C.

*Analysis.*—Calcd. for $C_{21}H_{25}NO_2$: C, 78.0; H, 7.8; N, 4.3. Found: C, 78.2; H, 7.3; N, 4.2.

This compound potentiated adrenalin at 5 mg./kg. and showed anti-inflammatory properties.

EXAMPLE 5

In a manner similar to that described in Example 4, the β-phenyl amide of α-(6-benzylindan-5-oxy)butyric acid, B.P. 208–214° C. at 0.04 mm., was obtained from β-phenethylamine and ethyl α-(6-benzylindan-5-oxy)butyrate.

*Analysis.*—Calcd. for $C_{28}H_{31}NO_2$: C, 81.3; H, 7.6; N, 3.4. Found: C, 80.8; H, 7.0; N, 3.3.

This compound had pronounced effect as a depressant of central nervous system activity.

EXAMPLE 6

In a manner similar to that described in Example 1, ethyl α-(6-[*p*-chlorobenzyl]-indan-5-oxy)butyrate which boiled at 190–198° C. at 0.3 mm., was obtained from ethyl α-bromobutyrate and 6-(*p*-chlorobenzyl)-5-indanol.

This ester (2.5 g.) was treated with 12 cc. of dimethylaminopropylamine and heated under reflux for 8 hours. Upon distillation there was obtained the dimethylaminopropylamide of α-(6-[*p*-chlorobenzyl]-indan-5-oxy)butyric acid which boiled at 226° C. at 0.09 mm.

*Analysis.*—Calcd. for $C_{25}H_{33}ClN_2O_2$: C, 70.0; H, 7.8. Found: C, 69.9; H, 7.9.

EXAMPLE 7

Ethyl α-(indan-4-oxy)butyrate, 22 g. (0.088 mole), was treated with 50 ml. of 3 N sodium hydroxide and heated under reflux for 2 hours. When cool, the solution so obtained was acidified with concentrated hydrochloric acid and the reaction mixture extracted with three 100 ml. portions of ether. On evaporation of the ether there was obtained 18.5 g. of α-(indan-4-oxy)butyric acid which was recrystallized from hexane, M.P. 111–112° C.

*Analysis.*—Calcd. for $C_{13}H_{16}O_3$: C, 70.9; H, 7.3. Found: C, 71.1; H, 7.2.

In a three-day test period, this compound administered orally at the level of 100 mg./kg. daily, effected a 51% reduction in the cholesterol levels of normal guinea pigs.

EXAMPLE 8

In a manner similar to that described in Example 6, ethyl α-(indan-4-oxy)butyrate was reacted with dimethylaminopropylamine to yield the dimethylaminopropylamide of α-(indan-4-oxy)butyric acid which boiled at 172° C. at 1 mm.

*Analysis.*—Calcd. for $C_{18}H_{28}N_2O_2$: C, 71.0; H, 9.3. Found: C, 71.1; H, 9.4.

This compound was a depressant of central nervous system activity showing 39.2% depression of motor activity when evaluated at 20 mg./kg. in rats.

Compounds which are typical of the purview of this invention are herein characterized and shown in Table I.

Table I

α-INDANOXYBUTYRIC ACIDS AND DERIVATIVES

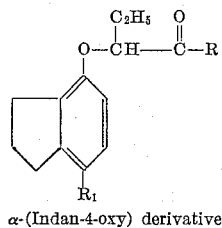

α-(Indan-4-oxy) derivatives

| R | R¹ | B.P., °C. | Mm. Press. | M.P., °C. |
|---|---|---|---|---|
| $C_2H_5O-$ | H | 114–118 | 0.2 | |
| $C_2H_5O-$ | $\Phi CH_2-$ | 178–190 | 0.3 | |
| $C_2H_5O-$ | p—Cl—$\Phi CH_2-$ | 190–198 | 0.3 | |
| HO— | H | | | 111–112 |
| HO— | p—Cl—$\Phi CH_2-$ | | | 116–117 |
| $\Phi CH_2CH_2NH-$ | H | 194–198 | 0.2 | |
| $\Phi CH_2CHCH_3NH-$ | H | | | 136–137 |
| $(C_2H_5)_2NCH_2CH_2NH-$ | H | 156–158 | 0.12 | |
| $(C_2H_5)_2NCH_2CH_2NH-$ | $\Phi CH_2-$ | 204–210 | 0.1 | |
| $(CH_3)_2N(CH_2)_3NH-$ | H | 172 | 1 | |
| $(CH_3)_2N(CH_2)_3NH-$ | $\Phi CH_2-$ | 201–216 | 0.1 | |
| $(CH_3)_2N(CH_2)_3NH-$ | p—Cl—$\Phi CH_2-$ | 226 | 0.09 | |
| $(C_2H_5)_2N(CH_2)_3NH-$ | H | 176–180 | 0.18 | |
| $(C_2H_5)_2N(CH_2)_3NH-$ | $\Phi CH_2-$ | 224 | 0.18 | |
| $(C_2H_5)_2N(CH_2)_3NH-$ | p—Cl—$\Phi CH_2-$ | 240–250 | 0.18 | |

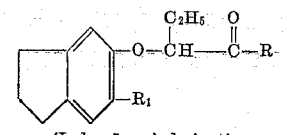

α-(Indan-5-oxy) derivatives

| R | R¹ | B.P., °C. | Mm. Press. | M.P., °C. |
|---|---|---|---|---|
| $C_2H_5O-$ | H | 122–126 | 0.3 | |
| $C_2H_5O-$ | $\Phi CH_2-$ | 182–190 | 0.7 | |
| $C_2H_5O-$ | p—Cl—$\Phi CH_2-$ | 190–198 | 0.3 | |
| HO— | H | | | 84– 85 |
| HO— | p—Cl—$\Phi CH_2-$ | | | 155–157 |
| $\Phi CH_2CH_2NH-$ | H | | | 64 |
| $\Phi CH_2CH_2NH-$ | $\Phi CH_2-$ | 208–214 | 0.04 | |
| $\Phi CH_2CH_2NH-$ | p—Cl—$\Phi CH_2-$ | | | 85– 90 |
| $\Phi CH_2CHCH_3NH-$ | H | 180 | 0.1 | |
| $\Phi CH_2CHCH_3NH-$ | $\Phi CH_2-$ | 234–244 | 0.2 | |
| $(C_2H_5)_2NCH_2CH_2NH-$ | H | 166 | 0.28 | |
| $(C_2H_5)_2NCH_2CH_2NH-$ | $\Phi CH_2-$ | 202–212 | 0.1 | |
| $(C_2H_5)_2NCH_2CH_2NH-$ | p—Cl—$\Phi CH_2-$ | 224 | 0.05 | |
| $(CH_3)_2N(CH_2)_3NH-$ | H | 178–180 | 0.46 | |
| $(CH_3)_2N(CH_2)_3NH-$ | $\Phi CH_2-$ | 220 | 0.11 | |
| $(CH_3)_2N(CH_2)_3NH-$ | p—Cl—$\Phi CH_2-$ | 226 | 0.09 | |
| $(C_2H_5)_2N(CH_2)_3NH-$ | H | 172 | 0.03 | |
| $(C_2H_5)_2N(CH_2)_3NH-$ | $\Phi CH_2-$ | 212–216 | 0.06 | |
| $(C_2H_5)_2N(CH_2)_3NH-$ | p—Cl—$\Phi CH_2-$ | 216–218 | 0.05 | |

The compounds herein prepared which are acids can be solubilized by formation of their salts with the non-toxic inorganic and organic bases. Alternatively, the dialkylaminoalkyl amides which are basic products can be solubilized as their salts with the non-toxic inorganic acids, or as the salts with organic acids. When formulated for therapeutic purposes it is to be understood that such forms of the compounds of this invention can also be applied as their non-toxic salts.

The new compound and its salts can be used as medicaments, for example, in the form of pharmaceutical preparations, which contain the compound or a salt thereof in admixture with a pharmaceutical organic or inorganic solid or liquid carrier suitable for oral or parenteral administration. For making these preparations there are used substances which do not react with the new compound, for example, water, gelatin, lactose, starches, magnesium stearate, talc, vegetable oils, gums, polyalkylene glycols, petroleum jelly, or another carrier known for medicaments.

The pharmaceutical preparations may be made up, for example, as tablets or in liquid form as solutions, suspensions or emulsions. If desired, they may be sterilized and/or may contain auxiliary substances such as preserving agents, stabilizing agents, wetting agents, emulsifying agents, salts for regulating the osmotic pressure, or buffers. They may also contain other therapeutically active substances. The preparations are made up by the usual methods.

It is to be understood that it is intended to cover all changes and modifications of the examples of the invention herein chosen for the purposes of illustration which do not constitute departures from the spirit and scope of the invention.

We claim:
1. The compound

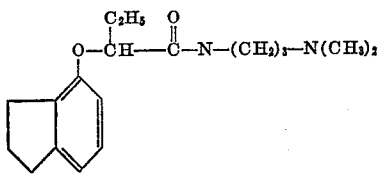

2. The compound

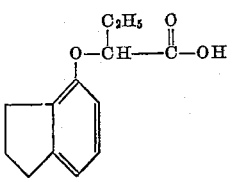

References Cited in the file of this patent
UNITED STATES PATENTS 2,437,258    Jones _____ Mar. 9, 1948

OTHER REFERENCES

Kruber et al.: Ber., 72B, 653–6 (1939).
Kruber et al.: Ber., 73B, 1175–7 (1940).
Hoskin: J. Am. Chem. Soc., 78, 3121–2 (1956).